(12) United States Patent
Naftolin

(10) Patent No.: US 9,294,612 B2
(45) Date of Patent: Mar. 22, 2016

(54) ADJUSTABLE MOBILE PHONE SETTINGS BASED ON ENVIRONMENTAL CONDITIONS

(75) Inventor: Jordan Naftolin, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 13/246,122

(22) Filed: Sep. 27, 2011

(65) Prior Publication Data

US 2013/0078976 A1 Mar. 28, 2013

(51) Int. Cl.
  *H04M 3/00* (2006.01)
  *H04M 1/725* (2006.01)
  *H04W 64/00* (2009.01)
  *H04W 8/24* (2009.01)
  *H04M 19/04* (2006.01)

(52) U.S. Cl.
  CPC .......... *H04M 1/72569* (2013.01); *H04W 8/245* (2013.01); *H04W 64/00* (2013.01); *H04W 64/006* (2013.01); *H04M 19/044* (2013.01)

(58) Field of Classification Search
  CPC .......... H04M 19/044; H04M 1/72569; H04W 64/006; H04W 64/00; H04W 8/245
  USPC ......... 455/418, 566, 550.1, 567, 569.1, 456.1
  See application file for complete search history.

(56) References Cited

U.S. PATENT DOCUMENTS

| | | | |
|---|---|---|---|
| 7,248,835 B2 | 7/2007 | Fan et al. | |
| 7,392,066 B2 * | 6/2008 | Haparnas | 455/567 |
| 7,869,768 B1 | 1/2011 | Vishlitzky | |
| 8,676,273 B1 * | 3/2014 | Fujisaki | H04M 1/6505 379/142.06 |
| 2005/0108642 A1 | 5/2005 | Sinclair, II | |
| 2006/0014569 A1 | 1/2006 | DelGiorno | |
| 2006/0116175 A1 * | 6/2006 | Chu | 455/567 |
| 2007/0037605 A1 * | 2/2007 | Logan | G08B 13/1427 455/567 |
| 2008/0036591 A1 * | 2/2008 | Ray | H04M 1/72569 340/540 |
| 2008/0102882 A1 | 5/2008 | Sutardja | |
| 2008/0153537 A1 | 6/2008 | Khawand et al. | |
| 2009/0309711 A1 | 12/2009 | Adappa et al. | |
| 2010/0159998 A1 | 6/2010 | Luke | |

(Continued)

FOREIGN PATENT DOCUMENTS

| | | |
|---|---|---|
| CN | 101076949 A | 11/2007 |
| CN | 101753711 A | 6/2010 |
| EP | 1 379 064 | 1/2004 |

OTHER PUBLICATIONS

Siewiorek, et al., "SenSay: A Context-Aware Mobile Phone", Retrieved at <<http://citeseerx.ist.psu.edu/viewdoc/download-?doi=10.1.1.70.4047&rep=rep1&type=pdf>>, Seventh IEEE International Symposium on Wearable Computers, Oct. 18-21, 2005, pp. 10.

(Continued)

*Primary Examiner* — Khai M Nguyen
(74) *Attorney, Agent, or Firm* — Judy Yee; L. Alan Collins; Micky Minhas

(57) ABSTRACT

A mobile communication device automatically adapts to different environments based on the ambient audio it detects. Device message indicators (e.g., ringers, haptic feedback devices) are automatically adjusted based on ambient audio levels and possibly other environmental parameters so that they are less intrusive in quieter environments and, in noisier environments, more intrusive so that they are more able to gain the attention of the user.

20 Claims, 4 Drawing Sheets

---

510 — Detect at least one environmental condition in an environment where the mobile communication device is located using a sensor available to the mobile communication device 520 — Adjust at least one characteristic of one or more of the message indicators based at least in part on the detected environmental condition

(56) References Cited

U.S. PATENT DOCUMENTS

2010/0232612 A1   9/2010   Basseas et al.
2010/0291950 A1*  11/2010  Lin .................... H04W 4/02
                                              455/456.3

OTHER PUBLICATIONS

Oliver, Sam., "Apple proposes audio sensor to auto-adjust iPhone ringtones", Retrieved at <<http://www.appleinsider.com/articles/09/01/22/apple_proposes_audio_sensor_to_auto_adjust_iphone_ringtones.html>>, Jan. 22, 2009, pp. 4.

PCT International Search Report and Written Opinion for Application No. PCT/US2012/057089, Mar. 12, 2013.

CN Notice on the First Office Action for Application No. 201210364587.5, Jul. 31, 2014.

CN Notice on the Second Office Action for Application No. 201210364587.5, Jan. 4, 2015.

* cited by examiner

When Background Noise Exceeds: ▢ Level

Low
Medium
High

Increase One or More of the Following
(Select all that Apply)

☐ Ringer Volume

☐ Display Brightness

☐ Vibration Intensity

ADJUSTABLE MOBILE PHONE SETTINGS BASED ON ENVIRONMENTAL CONDITIONS

BACKGROUND

Mobile communication devices are becoming increasingly common and are used in many environments. Accordingly, individuals often keep them on their person throughout large portions of the day. In part, the ubiquity of mobile communication devices arises because such devices are often capable of performing many different functions. For instance, mobile communication devices may support any of a variety of applications, such as a telephone application, a video conferencing application, an e-mail application, an instant messaging application, a blogging application, a digital camera application, a digital video camera application, a web browsing application, a digital music player application, and/or a digital video player application, and so on.

One problem with the ubiquity of these devices in on many different environments is that the level of ambient noise can vary dramatically from environment to environment, sometimes making it difficult to get the user's attention when an incoming call, text, email or the like is received. For example, there is generally a high level of ambient noise at a concert or sporting event and a lower level of ambient noise when the user is asleep. It is thus generally more difficult to get the user's attention in the former environment than in the latter environment for a given ringer volume. In some cases this problem can be addressed by the providing the mobile communication device with various profiles from which the user can choose. For instance, the user may be able to select from among normal, outdoor, quiet and noisy profiles, each of which determines a different combination of phone settings such as ringer volume, ringtone or haptic feedback intensity level. In this approach the user manually selects a different profile when moving from one environment to another, but this can become a nuisance and users can often forget to change the profile over the course of a day.

SUMMARY

To avoid the need to manually adjust the setting of a mobile communication device in different environments, a mobile communication device is provided which automatically adapts to different environments based on the ambient audio it detects. In one implementation, device message indicators such as ringer volume, ringtone intensity, the intensity and nature of haptic feedback (e.g. intensity and frequency of vibrations) and the brightness and the intensity of any visual indicators (e.g., display brightness and frequency at which the display flashes on and off) are adjusted so that they are less intrusive in quieter environments and, in noisier environments, more intrusive so that they are more able to gain the attention of the user. In one particular implementation, if the mobile communication device determines, via audio samples received through its microphone, that the audio level exceeds some threshold level, the ringer volume may increase, a more prominent ringtone that is easier to hear in a loud environment may be selected, a haptic feedback device may vibrate more strongly and/or with increased frequency, and/or a display or other visual indicator may increase in brightness.

In one particular implementation, the mobile communications device may measure one or more environmental parameters to supplement the information obtained from the measurement of the ambient audio levels when determining how to adjust one or more of the message indicators. The environmental parameters may be measured by sensors included in the mobile communication device and may include temperature, ambient light and motion. The environmental parameters and other data may be used heuristically to determine when and how the message indicators are to be adjusted to more effectively gain the user's attention.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 shows one example of a user interface through which a user can configure the message indicators of a mobile communications device.

DETAILED DESCRIPTION

Figure 1:
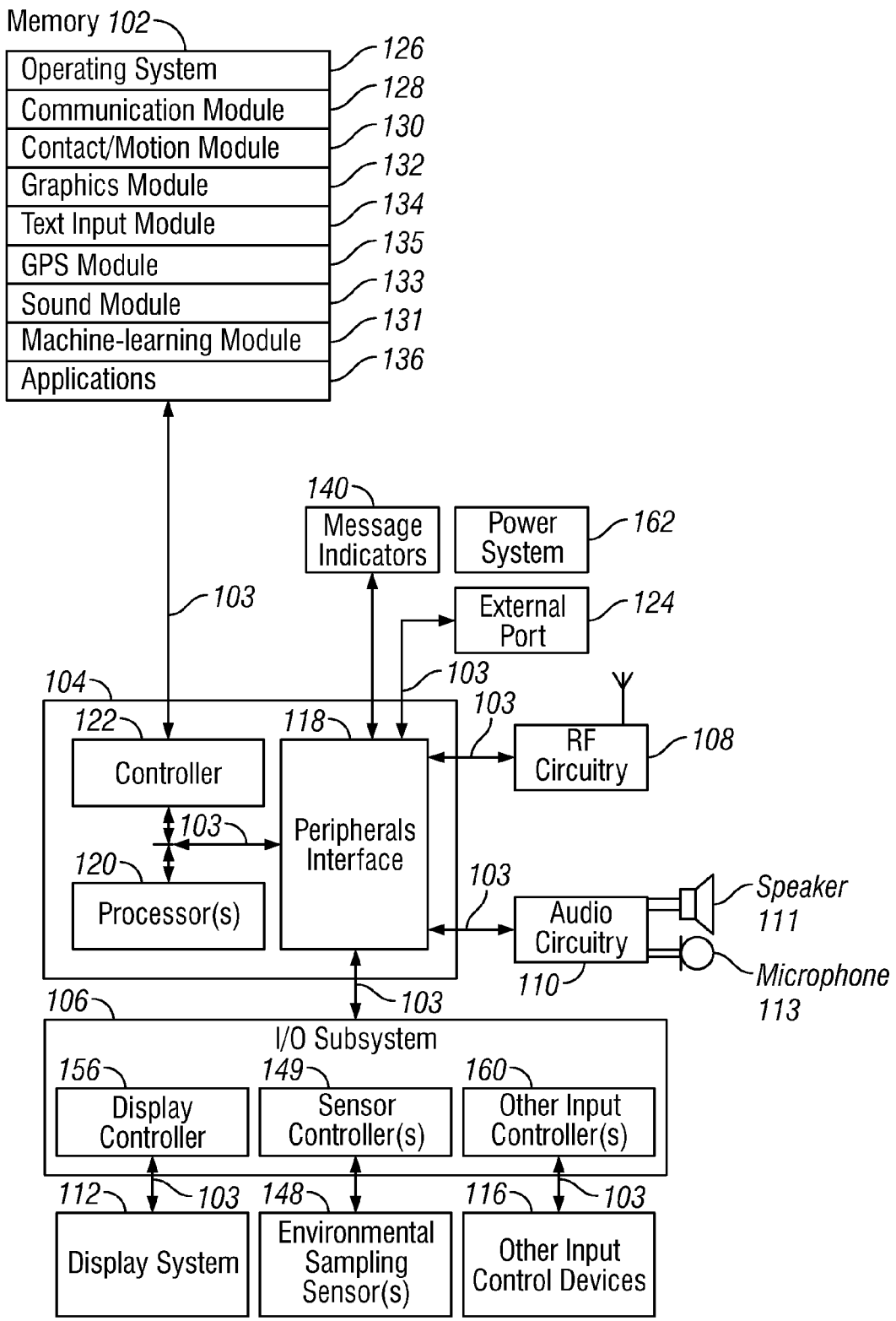
FIG. 1 is a block diagram illustrating one example of a mobile communication device.

As detailed below, in order to compensate for noisy environments, the audio, haptic, visual or other message indicator levels generated by a mobile communications device to inform the user of an incoming call, text, email or other message can be automatically increased or decreased depending on the environment in which the device is located. For this purpose the mobile communications device includes a message indicator control component, which is responsive to the ambient audio level in the device's local environment and generates one or more signals that are communicated to hardware features of the device to adjust one or more device settings. Device settings that may be adjusted include, without limitation, ringer volume, ringtone intensity, the intensity and nature of haptic feedback (e.g. intensity and frequency of vibrations) and the brightness and the intensity of any visual indicators (e.g., display brightness and frequency at which the display flashes on and off), which for convenience will all be collectively referred to herein as message indicators. That is, a message indicator refers to any mechanism by which a mobile communication device notifies a user that a message (e.g., an incoming phone call text message) has been received.

in some implementations other device settings in addition to those involving one or more message indicators may be adjusted based on the ambient audio level in the device's local environment. For example, the speaker volume could be automatically increased in environments with high ambient noise when the user is listening to music, using the speakerphone, playing games, and so on.

If for example, the mobile communication device determines, via audio samples received through its microphone, that the audio level exceeds some threshold level, the message indicator control component may increase the ringer volume, select a more prominent ringtone that is easier to hear in a loud environment, cause the phone to vibrate more strongly and/or with increased frequency, and/or increase the brightness of the device display or other visual indicator.

In some implementations the message indicator control component may be able to respond to multiple audio threshold levels so that it increases or decreases the prominence of one or more of the message indicators as each threshold is crossed.

In some implementations the message indicator control component may use various signal processing techniques to analyze the nature of the ambient audio and adjust one or more of the message indicators based on this analysis. For example, if the analysis determines that the device is located at a sports event, the message indicator control component may increase the ringer volume and the vibration intensity of a haptic feedback device. Similarly, if the analysis determines that the device is located at a musical event, the message indicator control component may only increase the vibration intensity level of the haptic feedback device.

In some implementations the message indicator control component is user configurable so that the user can select the various audio threshold levels to which the control component will respond and/or the various ways in which the message indicator control component will respond at different threshold levels.

FIG. 1 is a block diagram illustrating one example of a communication device 100, in some examples the device is a mobile communications device such as a wireless telephone that also contains other functions, such as PDA and/or music player functions. To that end the device may support any of a variety of applications, such as a telephone application, a video conferencing application, an e-mail application, an instant messaging application, a blogging application, a digital camera application, a digital video camera application, a web browsing application, a digital music player application, and/or a digital video player application. While the example in FIG. 1 is depicted as a mobile communications device, the computing device more generally may by any of a wide variety of different devices such as a laptop computer, a tablet computer, a smart phone and a netbook, for example.

The device 100 includes a memory unit 102 (which may include one or more computer readable storage media), a memory controller 122, one or more processors (CPU's) 120, a peripherals interface 118, RF circuitry 108, audio circuitry 110, a speaker 111, a microphone 113, display system 103, an input/output (I/O) subsystem 106, other input or control devices 116, and an external port 124. These components may communicate over one or more communication buses or signal lines. Along with the input or control devices 116, the speaker 111, microphone 113 and display system 103 form a user interface through which a user can enter and receive various types of information and can communicate with other individuals over communication networks using RF circuitry 108.

It should be appreciated that the device 100 is only one example of a mobile communications device 100 and that the device 100 may have more or fewer components than shown, may combine two or more components, or a may have a different configuration or arrangement of components. The various components shown in FIG. 1 may be implemented in hardware, software or a combination of both hardware and software, including one or more signal processing and/or application specific integrated circuits.

Memory unit 102 may include high-speed random access memory and non-volatile memory, such as one or more magnetic disk storage devices, flash memory devices, or other non-volatile solid-state memory devices. Access to memory unit 102 by other components of the device 100, such as the processor 120 and the peripherals interface 118, may be controlled by the memory controller 122. The peripherals interface 118 couples the input and output peripherals of the device to the processor 120 and memory unit 102. The one or more processors 120 run or execute various software programs and/or sets of instructions stored in memory unit 102 to perform various functions for the device 100 and to process data. In some examples the peripherals interface 118, the processor 120, and the memory controller 122 may be implemented on a single chip, such as a chip 104. In other examples they may be implemented on separate chips.

The RF (radio frequency) circuitry 108 includes a receiver and transmitter (e.g., a transceiver) for respectively receiving and sending RF signals, also called electromagnetic signals. The RE circuitry 108 converts electrical signals to/from electromagnetic signals and communicates with communications networks and other communications devices via the electromagnetic signals. The RE circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RE circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HS-DPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 form a part of the user interface provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from audible signals (i.e., sound waves). The speaker 111 and microphone 113 are two examples of audio transducers that may be employed in the mobile communications device. The audio circuitry 110 converts the electrical signal to audio data and transmits the audio data to the peripherals interface 118 for processing. Audio data may be retrieved from and/or transmitted to memory unit 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the display screen 112 and other input/control devices 116, to the peripherals interface 118.

The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some examples input controller(s) 160 may be coupled to any (or none) of the following: a keyboard, infrared port, USB port, and a pointer device such as a mouse.

The display screen 112 provides an input interface and an output interface between the device and a user. The display controller 156 receives and/or sends electrical signals from/to the display screen 112. The display screen 112 displays visual output to the user. The visual output may include graphics, text, icons, video, and any combination thereof (collectively termed "graphics").

The display screen 112 will generally include a suitable display such as an OLED display, PLED display, active matrix liquid crystal display, passive matrix liquid crystal display, electrophoretic display, cholesteric liquid crystal display, polymer dispersed liquid crystal and nematic liquid crystal display. In some implementations the display screen 112 may be a touch-screen display.

The device 100 may optionally include one or more environmental sensors 148, which are in communication with peripherals interface 118 via sensor controllers 149. Such sensors may be used to capture the value of various environmental parameters and may include, for example, an ambient temperature sensor, an ambient light level sensor, a proximity sensor, and/or an accelerometer for sensing acceleration.

The device 100 also includes a power system 162 for powering the various components. The power system 162 may include a portable power supply (e.g., battery) and components used to receive power from an alternating current (AC) source, a power management system, a recharging system, a power failure detection circuit, a power converter or inverter and any other components associated with the generation, management and distribution of power in portable devices.

In some embodiments, the software components stored in memory unit 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, a sound module 133 (or set of instructions) and applications (or set of instructions) 136.

The operating system 126 (e.g., Darwin, RTXC, LINUX, UNIX, OS X, Microsoft WINDOWS®, Android or an embedded operating system such as VxWorks) includes various software components and/or drivers for controlling and managing general system tasks (e.g., memory management, storage device control, power management, etc.) and facilitates communication between various hardware and software components. The communication module (or set of instructions) 128 facilitates communication with other devices over one or more external ports 124 and also includes various software components for handling data received by the RF circuitry 108 and/or the external port 124 (e.g., Universal Serial Bus (USB), FIREWIRE, etc.).

The graphics module 132 includes various known software components for rendering and displaying graphics on the display screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. The text input module (or set of instructions) 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., applications that provide location-based services such as weather widgets, local yellow page widgets, and map/navigation widgets).

The message indicator control module 136 implements the functionality described herein to adjust a characteristic of one or more message indicators in response to the ambient audio level in the device's local environment. The ambient audio level may be determined by the measuring the audio level with the microphone 113 or another sensor dedicated to this purpose. Additional functionality and implementations of the message indicator control module 136 will be discussed below.

The message indicators employed by the communication device 100 may include the speaker 111, display screen 112 and/or other message indicators 140 such a dedicated ringer and a haptic feedback mechanism. If a speaker or ringer is employed as message indicator, its characteristic that may be adjusted includes its volume level, for example. If a display is employed as a message indicator, it characteristic that may be adjusted includes its brightness, color scheme, and/or graphics scheme. A haptic feedback mechanism is arranged to provide tactile feedback to a user of the communication device. In this case, for example, the haptic interface may be employed to vibrate mobile communication device 100 in different ways when different types of messages are received.

The applications 138 may include any combination of the following illustrative modules: a contacts module, a telephone module; a video conferencing module; an e-mail client module an instant messaging (IM) module; a blogging module; a camera module; an image management module; a video player module; a music player module; a browser module; a word processing module; a voice recognition module; a calendar module; widget modules, which may include a weather widget, stocks widget, calculator widget, alarm clock widget, dictionary widget, and other widgets obtained by the user, as well as user-created widgets.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory unit 102 may store a subset of the modules and data structures identified above. Furthermore, memory unit 102 may store additional modules and data structures not described above.

Figure 2:
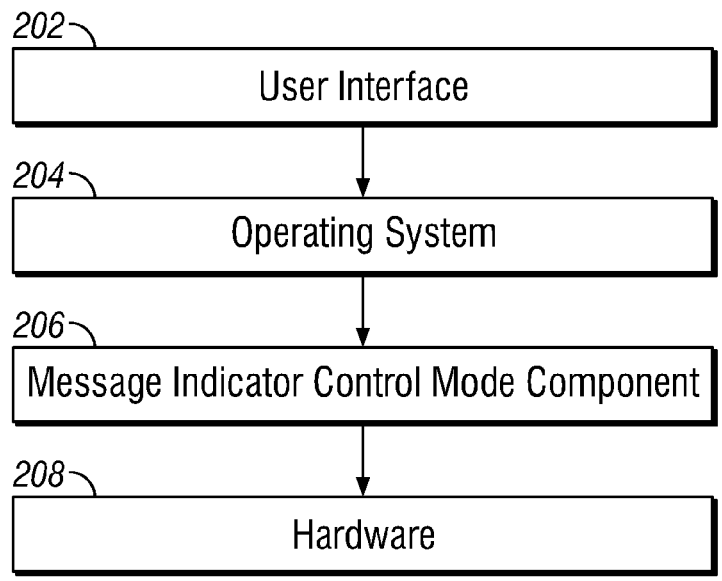
FIG. 2 shows one example of the relationship between a message indicator control module component and other components of a mobile communications device such as the device shown in FIG. 1.

FIG. 2 shows one example of the relationship between the message indicator control module or component and other components of a mobile communications device such as the device shown in FIG. 1. The system includes a graphical, text-based or other user interface 202 that is presented to a user, through which, among other things, the user can configure various message indicator settings. The user interface 202 interacts with the operating system 204 The operating system 204 interacts with the message indicator control component 206 for controlling certain hardware features 208 such as the message indicators available in the mobile communication device. In some implementations the message indicator level control component 206 may be directly incorporated into the operating system.

The user interface 202 allows a user to determine the manner in which the message indicator level control component 206 responds to different levels of ambient audio. For instance, the user can specify one or more audio threshold levels at which the message indicator control component will adjust one or more of the message indicators. In one example, the user may be allowed to select from two or more relative audio threshold levels that may be designated, in one case, low, moderate and high noise levels. The user may also be allowed to select which message indicators are to be adjusted at each relative audio threshold level which has been selected by the user. In addition, the user may select the manner in which each of these indicators are adjusted.

FIG. 3 shows one example of a user interface 360 through which a user can configure the message indicators of a mobile communications device. In this example the user can cause the ringer volume, screen brightness and/or the vibration intensity to increase when the background noise exceed any of three levels, denoted in FIG. 3 as low, medium and high. Of course, the particular user interface that is presented will differ from case to case, depending on, for instance, the message indicators available, the characteristics of those message indicators that can be adjusted, and the environmental conditions that are used in addition to ambient audio data to determine when one or more of the message indicator characteristics are to be adjusted.

Instead of allowing the user to configure the message indicator control component, the audio threshold levels and the manner in which the message indicators are adjusted at each threshold may be established by default. In some cases the user interface may allow the user to make adjustments to one or more of the default settings.

In some implementations, the mobile communications device may measure one or more other environmental parameters to supplement the information obtained from the measurement of the ambient audio levels when determining how to adjust one or more of the message indicators. These parameters may be measured by one or more optional environmental sensors incorporated into the mobile communications device (e.g. environmental sampling sensors 148 shown in the device of FIG. 1). As previously mentioned, these sensors may measure such environmental parameters as, for example, ambient temperature, ambient light and motion. Other parameters available to the mobile communication device which may be used include time of day, the user's calendar data, GPS location data, local event data, and charging status. These environmental parameters and other data may be used heuristically to determine when and how the message indicators are to be adjusted to more effectively gain the user's attention. In particular, these parameters may assist the device in determining the characteristics and nature of its surrounding environment, which in turn can be used to adjust one or more message indicators.

In one example, the mobile communication device may detect that the ambient light has fallen below a certain level, which may reflect, for instance, that the user is in a darkened theater or is about to go to bed. These environmental conditions may be detected and used in combination to refine the device's analysis of its surrounding environment. As an example, if in combination with the detection of a low ambient audio level, the device detects a low light level and a low noise level, and the time of day is in the middle of the night and the phone is being charged, the device may conclude that the user is in bed and therefore it will adjust the message indicators accordingly, such as by turning off the use of vibration or adjusting the light intensity on the screen.

Various additional conditions reflecting the environment in which the mobile communication device is located may be used to determine when and how to adjust the message indicators. For instance, in one implementation the mobile communication device includes a device location module such as a global positioning system (GPS) receiver (e.g., GPS module 135 shown in FIG. 1). GPS receivers are capable of updating a device's location on a real or near real-time basis. The location is typically represented in terms of the physical coordinates of the mobile device on the surface of the Earth, which typically outputs a location as latitude and longitude values. The OPS receiver can also employ other geo-positioning mechanisms, including, but not limited to, triangulation, assisted GPS (AGPS), E-OTD, CI, SAI, ETA, BSS or the like, to further determine the physical location of the mobile communication device 200. If the mobile communication device can compare its location data to a map or other database that identifies the venues corresponding to that location, the device may be able to more effectively determine the nature of its surrounding environment. If, for instance, the device uses its location information to determine that it is in a theater, it may automatically adjust its message indicators to better suit this environment. The venue map or database information needed to identify the venue in which the device is located, along with the processing used to compare the location data to the venue map or database information may be resident on the mobile communication device or it may be in whole or in part offered to the mobile communication device as a cloud-based service.

Yet another source of data that the mobile communication device may use to determine if it is in a particular venue that is to cause adjustment of its message indicators is calendar data that may be available from a scheduling application resident on the device. For instance, if the user enters data into the device's calendar specifying that he or she will be attending the theater on Tuesday at 7 pm or attending a dinner on Thursday at 8 pm, the message indicator control component may access this data and perform a keyword search to determine the type of environment it will be in on this date and time.

As yet another example, the mobile communications device may include proximity sensors, which may be used to determine if the device is an enclosed environment, possibly indicating that it is located in a pocket or purse. In this case, for example, the message indicator control component may cause the ringer volume to increase.

In other implementations the mobile communication device may, through other components, obtain other information that might be employed to determine the location of the device, including for example, Wi-Fi access points having particular service set identifiers (SSIDs), e.g., "home," "ABC theater", or even a MAC address, IP address, or the like which is associated with a specific location. In some cases the venue itself may participate in the venue determination process. For example, at the beginning of a movie, the theater may send a localized broadcast signal to all devices within the venue. Based on this signal, the message indictor control component may adjust the message indicators so that they are suitable for a theater environment. The broadcast may be of any type that can be detected by the mobile communication device and may be, for example, in the form of an audio, optical, RFID or text message.

Figure 4:
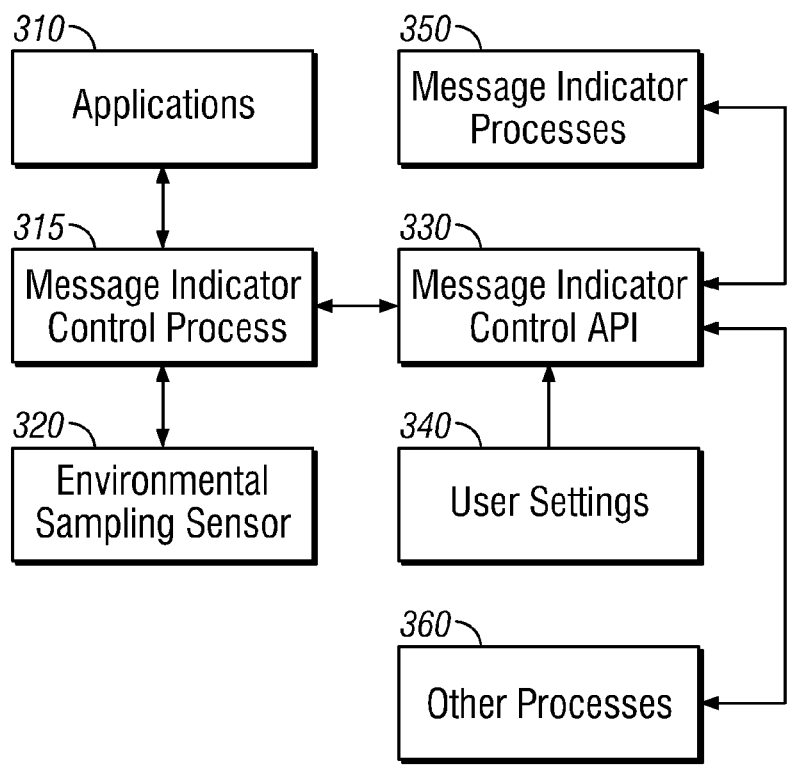
FIG. 4 is a block diagram depicting in more detail one particular implementation of the message indicator control component shown in FIG. 3.

FIG. 4 is a block diagram depicting in more detail one particular implementation of the message indicator control component 206 shown in FIG. 2. As shown, the message indicator control component 206 includes, among other things, a message indicator control process 315, message indicator control API 330, user settings 340, display control processes 350 and other devices processes.

In operation, audio information obtained from a microphone and possibly other information from one or more environmental sampling sensors 320 and one or more applications 310 (e.g., calendar) is provided to a message indicator control process 315 that communicates with the device operating system via a message indicator control API 330. The message indicator control process 315 extracts or otherwise parses pertinent information from the sampling sensor(s) 320 and/or the application(s) 310. The message indicator control process 315 also accesses user settings 340 that are maintained in memory or other storage via message indicator control API 330. The user settings 340 contain a record of information provided by the user through the user interface 202 (see FIG. 2). The information specifies the conditions under which the device is to adjust one or more of the message indicators and the manner in which they are to be adjusted. If no user settings have been specified, then a default process may be accessed by the message indicator control process 315. The message indicator control process 315 compares the audio information and any other pertinent information extracted or parsed from the sampling sensor(s) 320 and/or application(s) 310, and compares it to the information obtained from user settings 340 or from default settings. When sampling audio, the samples may be taken over a period of time, and various averaging techniques may be employed to determine the environment. This averaging can ensure that ambient noise anomalies are taken into account. If the message indicator control process 315 determines that the environmental conditions indicate that one or more of the message indicators are to be adjusted, the control process 315 causes the message indicator control API 330 to perform whatever adjustments are needed to the device hardware which controls the message indicators (e.g., ringer, haptic feedback mechanism, display).

Figure 5:
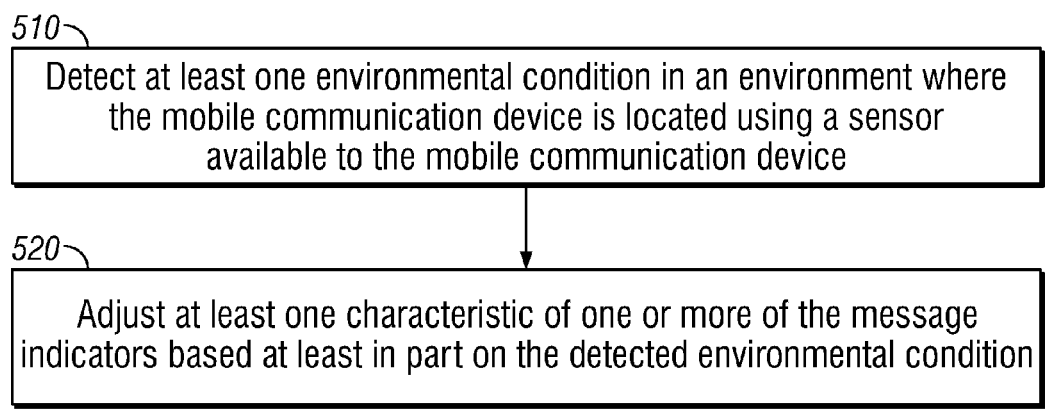
FIG. 5 is a flowchart illustrating one example of the operation of a mobile communication device which notifies a user of a change in its state or status.

FIG. 5 is a flowchart illustrating one example of the operation of a mobile communication device which notifies a user of a change in its state or status upon receipt of a message. The method begins at step 510 when at least one environmental condition in an environment where the mobile communication device is located is detected using a sensor available to the mobile communication device. For instance, the sensor may be a microphone, light sensor, temperature sensor, or the like, which may be incorporated into the mobile communication device. In response to satisfaction of at least one prescribed criterion by the detected environmental condition, at least one characteristic of one or more of the message indicators are adjusted at step 520 based at least in part on the detected environmental condition. The prescribed condition may be satisfied when the prescribed criterion, for example, crosses a threshold level. For instance, if the environmental condition is the ambient audio, the threshold level may be a prescribed volume level. In some instances the characteristic may be adjusted when a change in the state or status of the mobile communication device occurs, such as when it receives a text or voice message or when its power level falls below some threshold level.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method performed on a mobile communication device that includes at least one processor, a sensor, and memory, the method for adjusting a message indicator, the method comprising:
    detecting, by the mobile communication device via the sensor, at least one environmental condition at a location of the mobile communication device; and
    adjusting, by the mobile communication device based on calendar data that indicates an appointment, on a venue that corresponds to the appointment and the location, and on the detected environmental condition, at least one characteristic of the message indicator.

2. The method of claim 1 where the detected environmental condition includes ambient audio or ambient light.

3. The method of claim 1 where the adjusting is further based on a state or status of the mobile communication device.

4. The method of claim 1 where the at least one message indicator includes a ringer, display, and/or a haptic feedback mechanism.

5. The method of claim 1 where the adjusting is further based on the detected environmental condition crossing a threshold level.

6. The method of claim 1 where the adjusting is further based on at least one additional environmental condition.

7. The method of claim 5 where the threshold level has an associated default threshold level.

8. At least one computer-readable hardware memory device that comprises instructions that, based on by a mobile communication device that includes at least one processor, a sensor, and memory, configure the mobile communication device to perform actions for adjusting a message indicator, the actions comprising:
    detecting, by the mobile communication device via the sensor, at least one environmental condition at a location of the mobile communication device; and adjusting, by the mobile communication device based on calendar data that indicates an appointment, on a venue that corresponds to the appointment and the location, and on the detected environmental condition, at least one characteristic of the message indicator.

9. The at least one computer-readable hardware memory device of claim 8 where the adjusting is further based on at least one additional environmental condition.

10. The at least one computer-readable hardware memory device of claim 8 where the detected environmental condition includes ambient audio or ambient light.

11. The at least one computer-readable hardware memory device of claim 8 where the adjusting is further based on the detected environmental condition crossing a threshold level, or where the adjusting is further based on a state or status of the mobile communication device.

12. The at least one computer-readable hardware memory device of claim 11 where the threshold level has an associated default threshold level.

13. The at least one computer-readable hardware memory device of claim 8 where the at least one message indicator includes a ringer, display, and/or a haptic feedback mechanism.

14. A system comprising a mobile communication device and the at least one software module that are together configured for performing actions for adjusting a message indicator, the mobile communication device including at least one processor, a sensor, and memory, the actions comprising:

detecting, by the mobile communication device via the sensor, at least one environmental condition at a location of the mobile communication device; and adjusting, by the mobile communication device based on calendar data that indicates an appointment, on a venue that corresponds to the appointment and the location, and on the detected environmental condition, at least one characteristic of the message indicator.

15. The system of claim 14 where the adjusting is further based on at least one additional environmental condition.

16. The system of claim 14 where the detected environmental condition includes ambient audio or ambient light.

17. The system of claim 14 where the adjusting is further based on the detected environmental condition crossing a threshold level.

18. The system of claim 17 where the threshold level has an associated default threshold level.

19. The system of claim 14 where the adjusting is further based on a state or status of the mobile communication device.

20. The system of claim 14 where the at least one message indicator includes a ringer, display, and/or a haptic feedback mechanism.

* * * * *